(12) United States Patent
Suciu et al.

(10) Patent No.: US 7,976,273 B2
(45) Date of Patent: Jul. 12, 2011

(54) TIP TURBINE ENGINE SUPPORT STRUCTURE

(75) Inventors: Gabriel L. Suciu, Glastonbury, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1076 days.

(21) Appl. No.: 11/720,536

(22) PCT Filed: Dec. 1, 2004

(86) PCT No.: PCT/US2004/040078
§ 371 (c)(1),
(2), (4) Date: May 31, 2007

(87) PCT Pub. No.: WO2006/059989
PCT Pub. Date: Jun. 8, 2006

(65) Prior Publication Data
US 2008/0095618 A1    Apr. 24, 2008

(51) Int. Cl.
*F02K 3/02* (2006.01)
(52) U.S. Cl. .................. 415/182.1; 60/226.1; 60/39.162
(58) Field of Classification Search .............. 415/182.1, 415/209.2, 220, 199.5, 162, 211.2; 60/39.43, 60/268, 39.162, 226.1
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |

(Continued)

FOREIGN PATENT DOCUMENTS

DE    1301364    8/1969

(Continued)

*Primary Examiner* — Edward Look
*Assistant Examiner* — Dwayne J White
(74) *Attorney, Agent, or Firm* — Carlson, Gaskey & Olds, P.C.

(57) ABSTRACT

A tip turbine engine assembly according to the present invention includes a load bearing engine support structure (12). The engine support structure (12) includes an engine support plane (P) that is substantially perpendicular to an engine centerline (A) and first rotationally fixed member (50) disposed about the engine centerline (A) and cantilevered from the engine support plane (P). A support member extends radially outward from the first rotationally fixed member (50) and structurally supports a second rotationally fixed member (58) that is coaxial with the first rotationally fixed member. A rotor is mounted on the first rotationally fixed member and rotates about the engine centerline (A).

16 Claims, 2 Drawing Sheets

U.S. PATENT DOCUMENTS

| | | | |
|---|---|---|---|
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192303 A1* | 10/2003 | Paul ............................ 60/262 |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| FR | 2274788 | 1/1976 |
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

* cited by examiner

TIP TURBINE ENGINE SUPPORT STRUCTURE

BACKGROUND OF THE INVENTION

The present invention relates to a tip turbine engine, and more particularly to an assembly for structurally supporting the compressor rotor and compressor case.

An aircraft gas turbine engine of the conventional turbofan type generally includes a forward bypass fan and a low pressure compressor, a middle core engine, and an aft low pressure turbine all located along a common central axis. A high pressure compressor and a high pressure turbine of the core engine are interconnected by a central high spool shaft. The high pressure compressor is rotatably driven to compress air entering the core engine to a relatively high pressure. This high pressure air is then mixed with fuel in a combustor and ignited to form a high energy gas stream. The gas stream flows axially aft to rotatably drive the high pressure turbine which rotatably drives the high pressure compressor through the central high spool shaft. The gas stream leaving the high pressure turbine is expanded through the low pressure turbine which rotatably drives the bypass fan and low pressure compressor through a central low spool shaft.

Although highly efficient, conventional turbofan engines operate in an axial flow relationship. The axial flow relationship and rotating central shafts require that several engine cases on the outer portion of the engine directly bear the loads of engine components such as the compressor case.

A recent development in gas turbine engines is the more longitudinally compact tip turbine engine. Tip turbine engines locate an axial compressor forward of a bypass fan. The axial compressor and bypass fan share a common rotor for co-rotation. The common rotor is supported on a front end by a front support that is fixed to a housing via a first set of radially extending struts. The common rotor is supported on a rear end by a rear support that is fixed to the housing via a second set of radially extending struts.

The bypass fan of the tip turbine engine includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos.: 2003192303; 20030192304; and 20040025490. The integrated bypass fan-turbine drives the axial compressor through the common rotor. Such an architecture, however, depends on two sets of engine support planes, the first and second radial struts, to support the common rotor. Utilizing two engine support planes may complicate the assembly and may be unnecessary to support the length of the longitudinally compact engine.

Accordingly, it is desirable to provide a load bearing support structure from a single support plane for the compressor case and compressor rotor.

SUMMARY OF THE INVENTION

The tip turbine engine according to the present invention provides a load bearing engine support structure for a compressor case. The engine support structure includes an outer case that supports exit guide vanes, a static outer support housing, a gearbox housing, and a first rotationally fixed member. The exit guide vanes bear radial loads and define an engine support plane that is perpendicular to an engine centerline. The first rotationally fixed member is disposed about the engine centerline and includes a static inner support shaft that is cantilevered relative to the engine support plane such that loads borne by the static inner support shaft are transferred through the exit guide vanes in the engine support plane and to the outer case. A second rotationally fixed member, the compressor case, is coaxial with the static inner support shaft. The compressor case is fixedly mounted to a support member that extends radially outward from the static inner support shaft. The static inner support shaft transfers the load of the compressor case through the engine to the outer case via the engine support plane, thereby structurally supporting the compressor case. An axial compressor rotor is mounted for rotation between the static inner support shaft and compressor case through a forward bearing assembly and an aft bearing assembly.

The present invention therefore provides a load bearing support structure assembly for structurally supporting the compressor case and compressor rotor from a single engine support plane.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
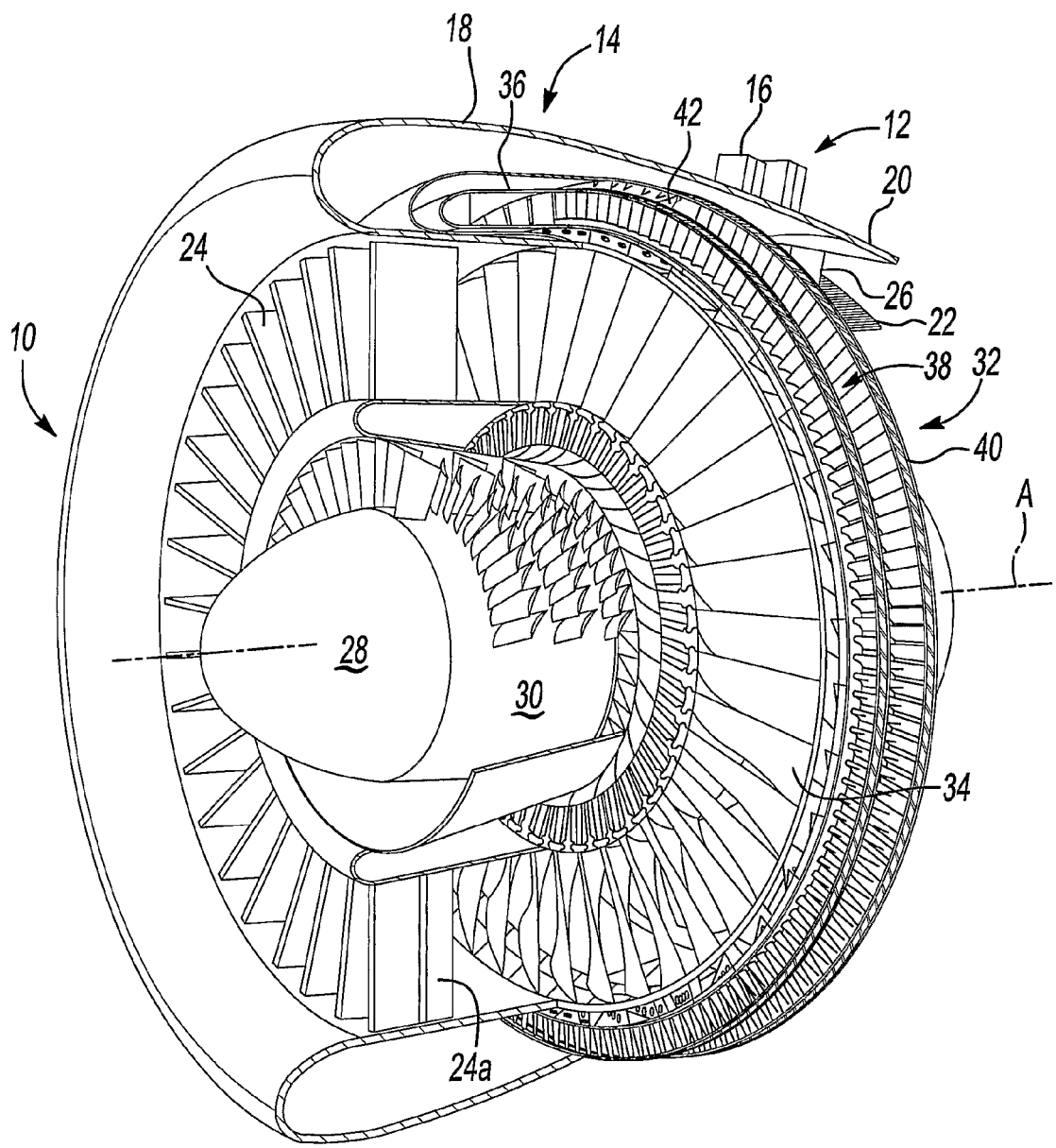
FIG. 1 is a partial sectional perspective view of an exemplary tip turbine engine assembly of the present invention.

FIG. 1 illustrates a partial sectional perspective view of a tip turbine engine (TTE) gas turbine engine 10. The engine 10 includes a load bearing engine support structure 12. The engine support structure 12 includes an outer case 14 with engine mounts 16 located about the periphery. The outer case 14 includes a forward case portion 18 and an exhaust case portion 20 which includes an exhaust mixer 22. A plurality of fan inlet guide vanes 24 are mounted on the forward case portion 18 and extend radially inward from the forward case portion 18. Each inlet guide vane 24 preferably includes a variable trailing edge 24A. A plurality of exit guide vanes 26 extend radially inward from the exhaust case portion 20.

A nosecone 28 is preferably located along the engine centerline A to improve airflow into an axial compressor 30. The axial compressor 30 is mounted about the engine centerline A behind the nosecone 28.

A fan-turbine rotor assembly 32 is mounted for rotation about the engine centerline A aft of the axial compressor 30. The fan-turbine rotor assembly 32 includes a plurality of hollow fan blades 34 to provide internal, centrifugal compression of the compressed airflow from the axial compressor for distribution to an annular combustor 36 located within the outer case 14.

A turbine 38 includes a plurality of tip turbine blades 40 (two stages shown) which rotatably drive the hollow fan blades 34 relative to a plurality of tip turbine stators 42 which extend radially inward from the outer case 14. The annular combustor 36 is axially forward of the turbine 38 and communicates with the turbine 38.

Figure 2:
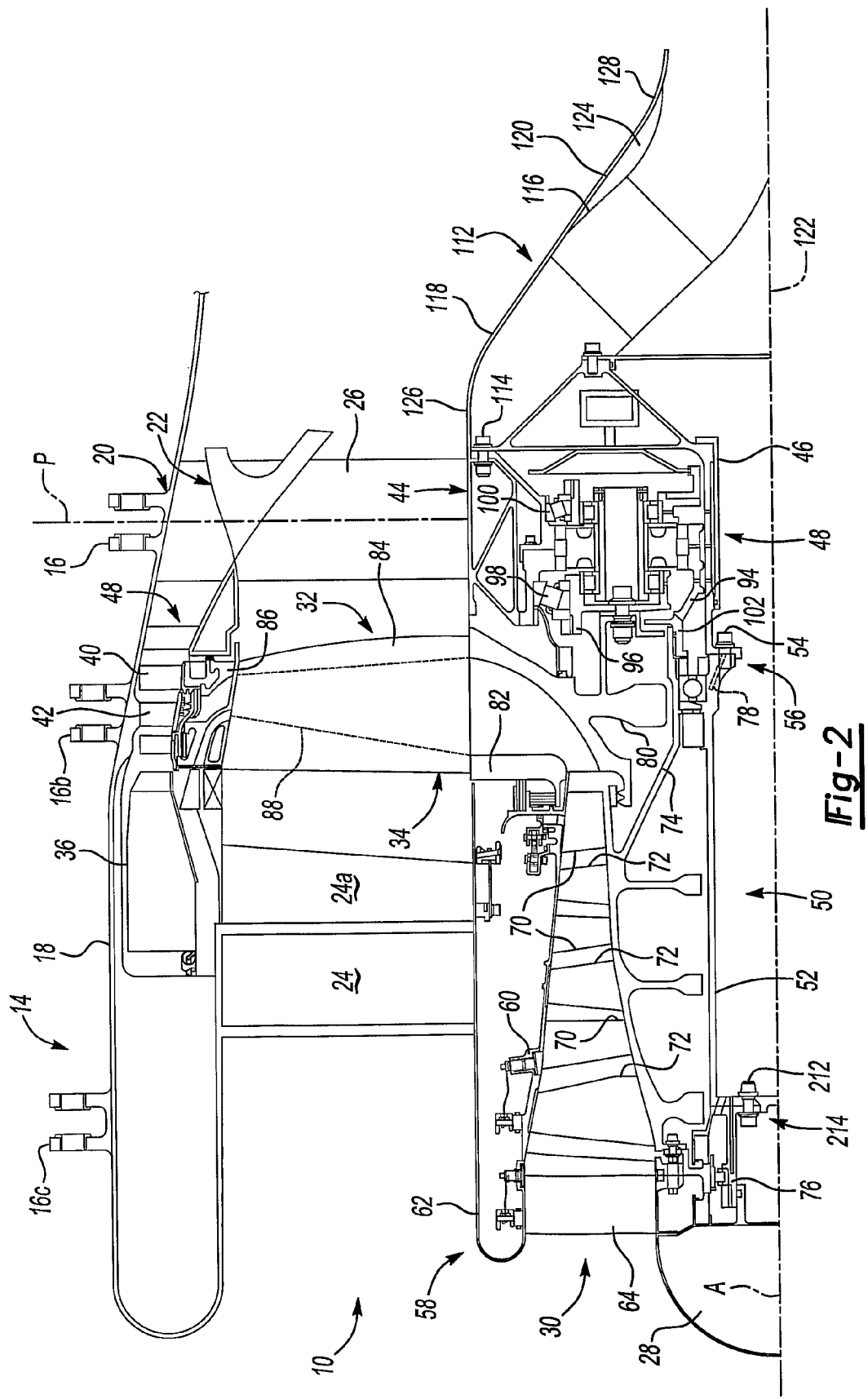
FIG. 2 is a cross-sectional view of the tip turbine engine of FIG. 1.

Referring to FIG. 2, the engine support structure 12 includes engine mounts 16 on the periphery of the outer case 14 that are preferably located aft of the fan-turbine rotor assembly 32 and coplanar with an engine support plane P. The exit guide vanes 26 define the engine support plane P by virtue of providing radial load bearing structural support relative to the engine centerline A. The engine support plane is the only engine support plane of the engine 10, as the inlet guide vanes 24 do not provide appreciable radial load bearing structural support. Alternatively, the engine mounts 16 may be located coplanar with the fan-turbine rotor assembly 32 or forward of the fan-turbine rotor assembly 32, as illustrated by the phantom engine mounts 16B and 16C, respectively.

The engine mounts 16 are mounted on the exhaust case portion 20 of the outer case 14, which is structurally attached to the exit guide vanes 26. The exit guide vanes 26 are preferably integrally formed with the exhaust case portion 20, however, the exit guide vanes 26 may alternatively be attached with a fastener, by welding, or by other method of attachment.

The exit guide vanes 26 are structurally attached to a static outer support housing 44. Preferably, the exit guide vanes 26 are attached to the static outer support housing 44 by welding, however, other methods of attachment such as by fastener may be utilized.

The static outer support housing 44 forms part of a gearbox housing 46, which houses a gearbox assembly 48. The gearbox housing 46 is structurally attached to a first rotationally fixed member 50, which is disposed about the engine centerline A. The first rotationally fixed member 50 includes a static inner support shaft 52. The static inner support shaft 52 has a cylindrical shape about the engine centerline A and is attached to the gearbox housing 46 with a fastener 54 at a flange joint 56.

The static inner support shaft 52 is cantilevered from the engine support plane P. That is, a load borne by the static inner support shaft 52, which is parallel with the engine centerline A, is transferred to the outer case 14 through the exit guide vanes 26 in the perpendicular engine support plane P. The engine support plane P is the sole support plane of the engine 10 because it is the only radial plane along which a load on the static inner support shaft can be transferred to the outer case 10.

The axial compressor 30 includes a second rotationally fixed member 58, a compressor case 60. A splitter 62 extends from the compressor case 60 and attaches to the inlet guide vane 24, however, this attachment does not provide structural support to the splitter 62 or compressor case 60.

The compressor case 60 is spaced radially outward relative to the engine centerline A from the static inner support shaft 52 and is coaxial with the static inner support shaft 52. The compressor case 60 is fixedly mounted to a support member 64 that extends radially outward from the static inner support shaft 52. The static inner support shaft 52 structurally supports the compressor case 60. That is, the static inner support shaft 52 transfers the load of the compressor case 60 through the engine 10 to the outer case 14 via the engine support plane P.

A plurality of compressor vanes 70 extend radially inwardly from the compressor case 60 between stages of compressor blades 72, which are mounted on an axial compressor rotor 74. The axial compressor rotor 74 is a distinct component from the fan-turbine rotor assembly 32. That is, the axial compressor rotor 74 is not integrally formed as a single rotor with the fan-turbine rotor assembly 32 and the axial compressor rotor is capable of rotating at a different speed than the fan-turbine rotor assembly 32. The compressor blades 72 and compressor vanes 70 are arranged circumferentially about the axial compressor rotor 74 in stages (three stages of compressor blades 72 and compressor vanes 70 are shown in this example). The axial compressor rotor 74 is mounted for rotation between the static inner support shaft 52 and compressor case 60 through a forward bearing assembly 76 and an aft bearing assembly 78.

The fan-turbine rotor assembly 32 includes a fan hub 80 that supports a plurality of the hollow fan blades 34. Each hollow fan blade 34 includes an inducer section 82, a hollow fan blade section 84 and a diffuser section 86. The inducer section 82 receives airflow from the axial compressor 30 generally parallel to the engine centerline A and turns the airflow from an axial airflow direction toward a radial airflow direction. The airflow is radially communicated through a core airflow passage 88 within the fan blade section 84 where the airflow is centrifugally compressed. From the core airflow passage 88, the diffuser section 86 turns the airflow toward an axial airflow direction toward the annular combustor 36. Preferably the airflow is diffused axially forward in the engine 10, however, the airflow may alternatively be communicated in another direction.

The gearbox assembly 48 aft of the fan-turbine rotor assembly 32 provides a speed increase between the fan-turbine rotor assembly 32 and the axial compressor 30. The gearbox assembly 48 includes a sun gear shaft 94 which rotates with the axial compressor 30 and a planet carrier 96 which rotates with the fan-turbine rotor assembly 32 to provide a speed differential therebetween. The gearbox assembly 48 is preferably a planetary gearbox that provides co-rotating or counter-rotating rotational engagement between the fan-turbine rotor assembly 32 and the axial compressor rotor 74. The gearbox assembly 48 is mounted for rotation between the sun gear shaft 94 and the static outer support housing 44 through a forward bearing 98 and a rear bearing 100. The forward bearings 98 and the rear bearing 100 are both tapered roller bearings and both handle radial loads. The forward bearing 98 handles the aft axial load, while the rear bearing 100 handles the forward axial loads.

The sun gear shaft 94 is rotationally engaged with the axial compressor rotor 74 at a splined interconnection 102 or the like. Alternatively, the gearbox assembly 48 could provide a speed decrease between the fan-turbine rotor assembly 32 and the axial compressor rotor 74.

A tailcone assembly 112 is mounted on the static outer support housing 44 with a set of fasteners 114, although only one fastener is illustrated in the FIG. 2. The tailcone assembly 112 houses a device 116, such as an oil cooler or other device, and includes a frustoconical surface 118. A wall structure 120 disposed about central axis 122 forms the frustoconical surface 118. The wall structure 120 defines an interior compartment 124 and a forward portion 126 that tapers to an aft portion 128 of the tailcone assembly 112.

In operation, air enters the axial compressor 30, where it is compressed by the three stages of the compressor blades 72 and compressor vanes 70. The compressed air from the axial compressor 30 enters the inducer section 82 in a direction generally parallel to the engine centerline A and is turned by the inducer section 82 radially outwardly through the core airflow passage 88 of the hollow fan blades 34. The airflow is further compressed centrifugally in the hollow fan blades 34 by rotation of the hollow fan blades 34. From the core airflow passage 88, the diffuser section 86 turns the airflow axially forward in the engine 10 into the annular combustor 36. The compressed core airflow from the hollow fan blades 34 is mixed with fuel in the annular combustor 36 and ignited to form a high-energy gas stream. The high-energy gas stream is expanded over the plurality of tip turbine blades 40 mounted about the outer periphery of the fan-turbine rotor assembly 32 to drive the fan-turbine rotor assembly 32, which in turn drives the axial compressor 30 through the gearbox assembly 48.

Concurrent therewith, the fan-turbine rotor assembly 32 discharges fan bypass air axially aft and the exhaust mixer 22 merges bypass air with the high energy gas stream in the exhaust case portion 20. The exit guide vanes 26 located between the static outer support housing 44 and the outer case 10 guide the combined airflow out of the engine 10 to provide forward thrust.

The present invention therefore provides a load bearing assembly for structurally supporting the compressor case 60 and axial compressor rotor 74 from a single engine support plane.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine assembly comprising:
   a first rotationally fixed member disposed about an engine centerline;
   a support member extending radially from said first rotationally fixed member;
   a second rotationally fixed member attached to said support member and disposed coaxially with said first rotationally fixed member;
   a rotor mounted between said first rotationally fixed member and said second rotationally fixed member, said rotor comprising compressor blades that extend radially outward;
   a guide vane extending radially outwards from the second rotationally fixed member; and
   a housing disposed radially outward of the first rotationally fixed member, wherein the housing is attached to both the first rotationally fixed member and the guide vane.

2. The assembly as recited in claim 1, wherein said first rotationally fixed member and said second rotationally fixed member define a flow path therebetween.

3. The assembly as recited in claim 2, wherein said rotor is rotatable in said flow path.

4. The assembly as recited in claim 1, wherein said first rotationally fixed member comprises a static cylindrical shaft.

5. The assembly as recited in claim 1, wherein said second rotationally fixed member comprises a compressor case with compressor vanes that extend radially inward.

6. The assembly as recited in claim 5, wherein the case is disposed radially outwards of the first rotationally fixed member, wherein the guide vane extends between the first rotationally fixed member and the case and is attached to both the first rotationally fixed member and the case.

7. The assembly as recited in claim 1, further comprising a gearbox assembly aft of the support member.

8. A tip turbine engine assembly comprising:
   a plurality of fan blades fixed to a fan rotor rotatable about an engine centerline, each of said plurality of fan blades defining a core airflow passage therethrough;
   a first rotationally fixed member disposed coaxially with said engine centerline;
   a support member extending radially from said first rotationally fixed member;
   a second rotationally fixed member fixed to said support member and disposed coaxially with said first rotationally fixed member;
   a compressor rotor mounted on said first rotationally fixed member for rotation about said engine centerline, wherein a guide vane extends radially outwards from the second rotationally fixed member.

9. The assembly as recited in claim 8, wherein said compressor rotor and said fan rotor are distinct from one another.

10. The assembly as recited in claim 8, wherein said compressor rotor and said fan rotor rotate at different speeds.

11. The assembly as recited in claim 8, wherein said first rotationally fixed member comprises a cylindrical shaft.

12. The assembly as recited in claim 8, wherein second rotationally fixed member comprises a compressor case with compressor vanes that extend radially inward.

13. The assembly as recited in claim 8, wherein said compressor rotor comprises compressor blades that extend radially outward.

14. The assembly as recited in claim 8, wherein a case is disposed radially outward of the second rotationally fixed member, wherein the guide vane is attached to the case and the second rotationally fixed member.

15. The assembly as recited in claim 8, further comprising a gearbox assembly aft of the plurality of fan blades.

16. The assembly of claim 8, further comprising a housing disposed radially outward of the first rotationally fixed member, wherein the housing is attached to both the first rotationally fixed member and the guide vane.

\* \* \* \* \*